United States Patent [19]

Heng

[11] Patent Number: 5,495,164
[45] Date of Patent: Feb. 27, 1996

[54] BOOST CONVERTER

[75] Inventor: Phua C. Heng, Nagaoka, Japan

[73] Assignee: Nemic-Lambda Kabushiki Kaisha, Japan

[21] Appl. No.: 136,514

[22] Filed: Oct. 12, 1993

[30] Foreign Application Priority Data

Oct. 12, 1992 [JP] Japan .................... 4-070958

[51] Int. Cl.⁶ .............. G05F 1/00; G05F 1/40; H02J 1/00; H02M 3/24
[52] U.S. Cl. .............. 323/222; 323/287; 363/70; 307/58; 307/82
[58] Field of Search ............... 323/222, 225, 323/282, 285, 286, 287; 363/65, 67, 69, 70; 307/32, 55, 58, 82

[56] References Cited

U.S. PATENT DOCUMENTS

| | | | |
|---|---|---|---|
| 3,913,000 | 10/1975 | Cardwell, Jr. | 323/222 |
| 4,270,165 | 5/1981 | Carpenter et al. | 363/65 |
| 4,595,873 | 6/1986 | Musil | 323/222 |
| 5,179,508 | 1/1993 | Lange et al. | 363/16 |
| 5,406,192 | 4/1995 | Vinciarelli | 323/222 |
| 5,428,523 | 6/1995 | McDonnal | 307/58 |

FOREIGN PATENT DOCUMENTS 2-269469  11/1990  Japan .

*Primary Examiner*—Matthew V. Nguyen
*Attorney, Agent, or Firm*—Quarles & Brady

[57] ABSTRACT

A boost converter having a plurality of boost converter units in parallel operation. Within each boost converter unit, current transformers 22,23 are connected in series respectively to switching element 7 and diode 8. The current transformers 22,23 permit detected current therefrom to output current detection signals from current detection circuits. Then, the current detection signals within one converter unit 3 will be compared with those within the other converter unit 3A in parallel operation by comparing circuit 33. On the basis of a result of such comparison, D.C. output voltage Vout can be controlled to be equal to each other in each converter unit 3,3A.

6 Claims, 3 Drawing Sheets

BOOST CONVERTER

BACKGROUND OF THE INVENTION (a) Field of the Invention

The present invention relates to Boost Converter for power factor and harmonic correction circuit of Switching Power Supply.

(b) Description of Prior Art

In FIG. 3 showing a conventional boost-chopper type converter in parallel operation, which is for example disclosed in Japanese Patent Laid-open No. 2-269469, reference numeral 1 designates A.C.power source, while reference numeral 2 designates a rectifier circuit in each converter unit 3,3A which can full-wave rectify A.C.input voltage from said A.C.power source 1 in order to output D.C.input voltage Vin, thus D.C.voltage source 4 can be constructed by said A.C.power source 1 and rectifier circuit 2.

To the both output terminals of said rectifier circuit 2 is connected a series circuit comprising inductance 6 and switching element 7 (or MOSFET) across resistor 5 for current detection, whereas to the both terminals of said switching element 7 is connected a series circuit comprising diode 8 and smoothing capacitor 9, of which the opposite terminals on the output side of said diode 8 are further connected to output terminals +V, −V respectively.

Then, on the basis of the difference between the current detection signals detected by resistor 5 and the voltage detection signals obtained by dividing D.C.output voltage Vout between said output terminals +V and −V, control circuit 10 can control the pulse conducting width for said switching element 7, thus preset D.C.output voltage Vout can be supplied to common load 11 across the output terminals +V, −V.

In aforesaid serial switching operation of the switching element 7, D.C.input voltage Vin is applied to inductance 6 during turning-on of the switching element 7, so that inductor current IL flowing through the inductance 6 ramps up, being followed by charging energy in said inductance 6. Whereas, during turning-off of said switching element 7, said energy charged in the inductance 6 is delivered to said smoothing capacitor 9 on the output side of diode 8, together with D.C.input voltage Vin from the rectifier circuit 2, with inductor current IL ramping down, and thus, D.C.output voltage Vout higher than D.C.input voltage Vin can be obtained.

At that time, the switching element 7 is on-off controlled by control circuit 10 so that said input current Iin from rectifier circuit 2, having average value of said inductance current IL, may take the full-wave rectified waveform proportional to D.C.input voltage Vin, whereby the equivalent to pure resistance load for said A.C.power source 1 can be obtained along with the improvement of power factor.

However, the above conventional art has a few problems described below;

In parallel operation, because of the voltage drop difference caused between output terminals +V,−V of converter units 3,3A and load 11, load currents I1 and I2, flowing into discrete converter units 3,3A across discrete output terminals −V, are caused to be inconsistent with each other. Especially in the case of boost converter shown in FIG. 3, each load current I1 and I2 flows through the rectifier circuit 2 to be fed back to common A.C.power source 1 on the input side, thus output balance of each converter unit 3,3A is inevitably lost or broken, therefore, stable control cannot be performed.

SUMMARY OF THE INVENTION

Accordingly, it is the main object of the present invention to provide a Boost Converter which can be stably controlled without losing an output balance in parallel operation.

In accordance with a major feature of the present invention, there is provided a structure for a Boost Converter comprising:

each converter unit comprising a series circuit of at least an inductance and a switching element connected to D.C. voltage source; each series circuit of at least a diode and a smoothing capacitor connected to both terminals of said switching element; and each control circuit for said switching element, being so structured that electric energy can be charged within said inductance during the turning-on of said switching element, while said energy can be discharged for delivering the same to the output side during turning-off of the switching element; current transformers for detection of current connected in series respectively to said switching element and diode;

each current detection circuit to output current detection signals by means of said detected current from the transformers, a current balance circuit for controlling pulse conducting width for said switching element by means of said control circuit on the basis of a result of comparison, which is able to be obtained in parallel operation by comparing internal current detection signals from one current detection circuit within one converter unit, with other external detection signals from the other current detection circuit within the other converter unit.

BRIEF DESCRIPTION OF THE DRAWINGS

Other objects, features and advantages of the invention will be apparent to those skilled in the art from the following description of the preferred embodiments of the invention, wherein reference is made to the accompanying drawings, of which.

DESCRIPTION OF A PREFERRED EMBODIMENT

Hereinafter is explained an embodiment of the invention with reference to FIGS. 1 and 2.

Figure 1:
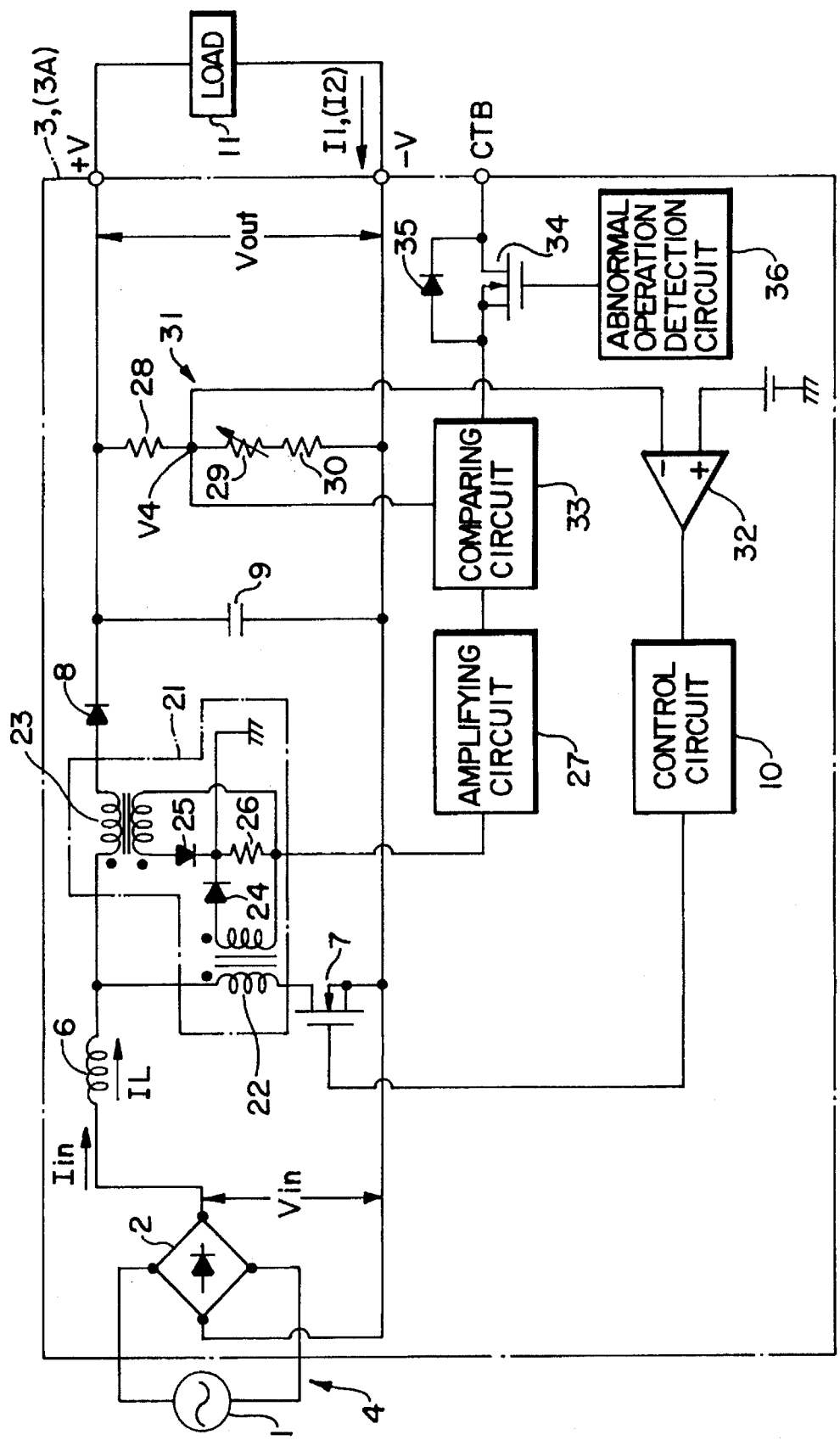
FIG. 1 is a circuit diagram showing an embodiment of a Boost Converter of the present invention.
Figure 2:
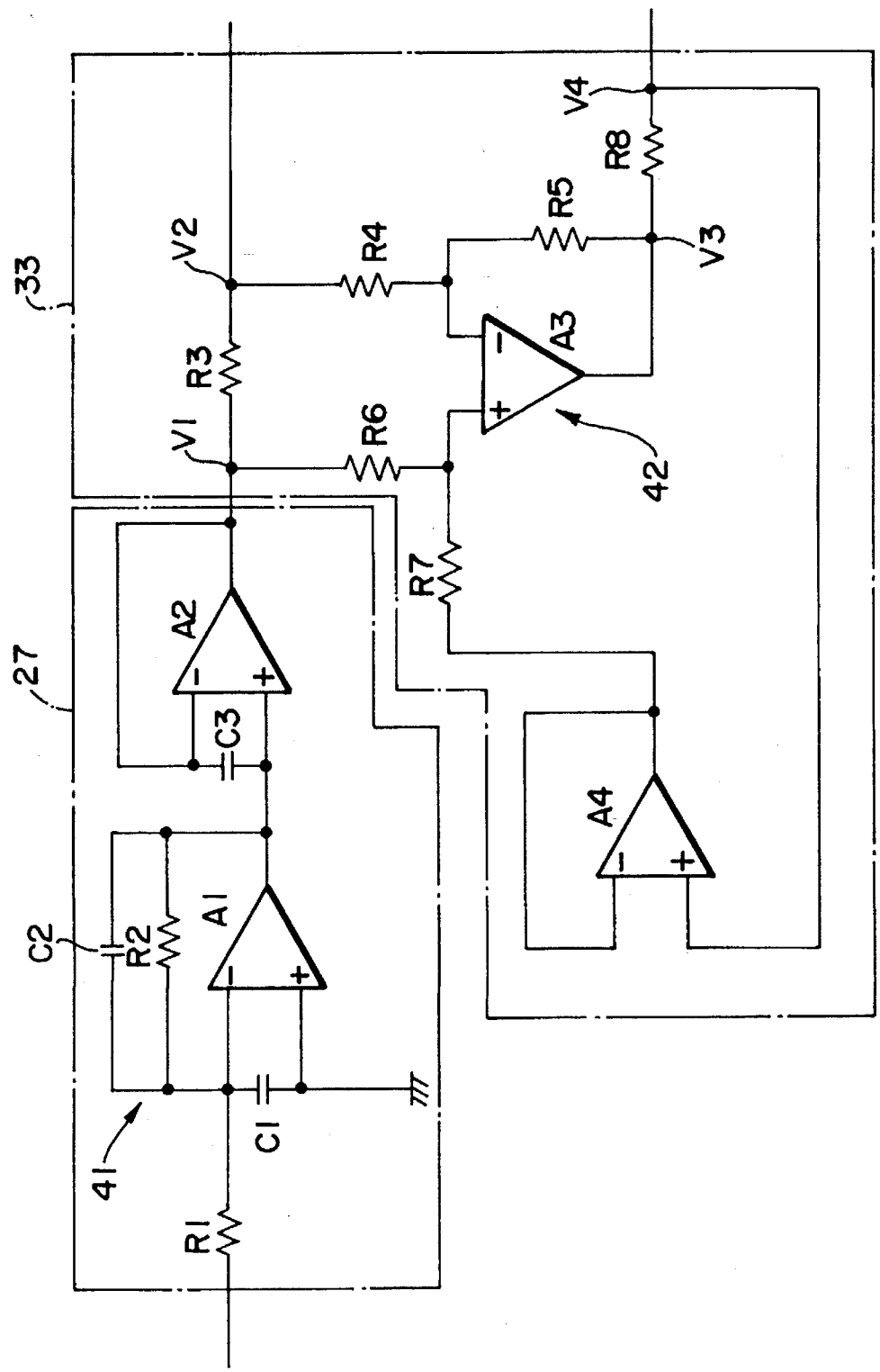
FIG. 2 is a circuit diagram showing an amplifying circuit and comparing circuit of an embodiment of the present invention.
Figure 3:
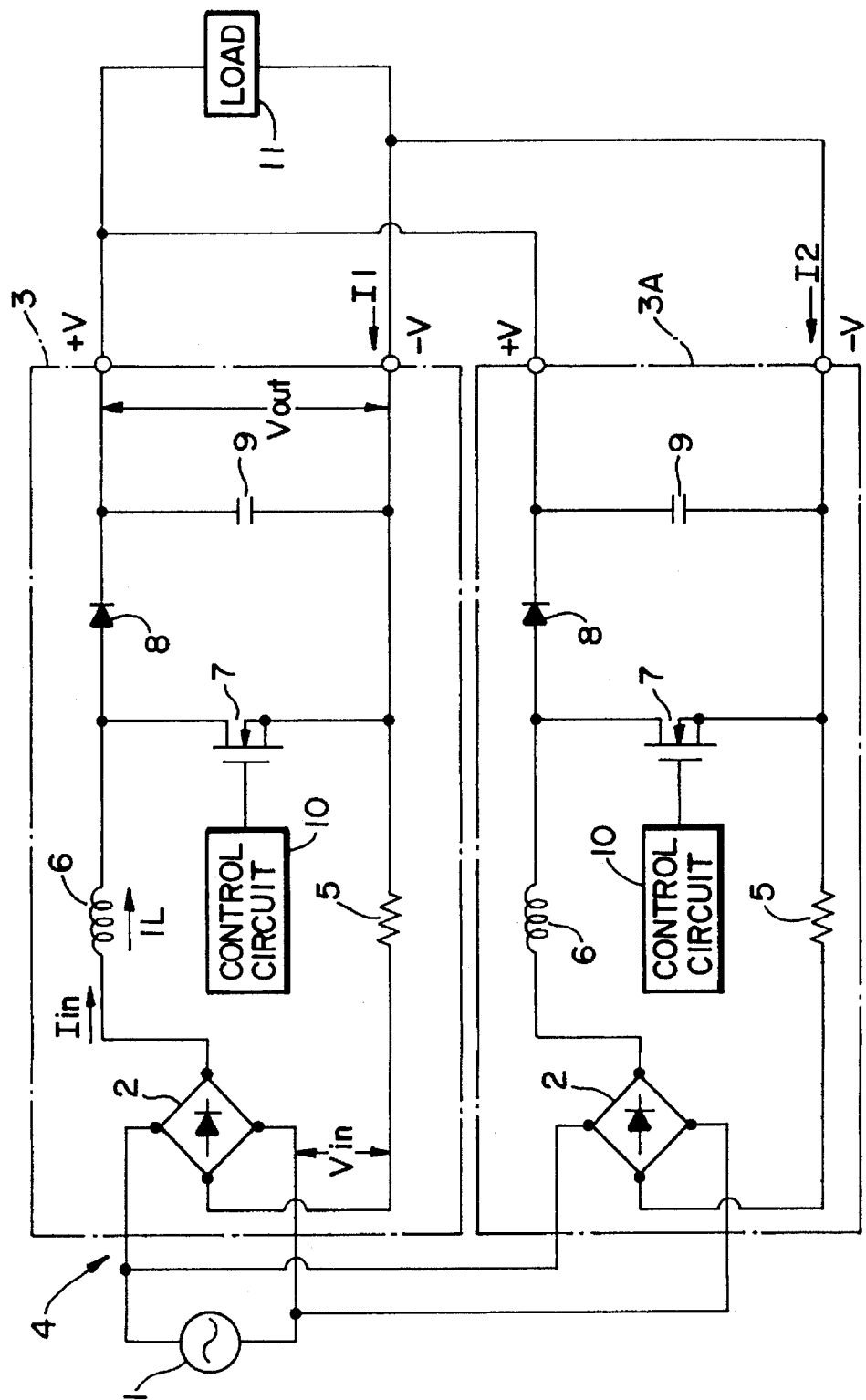
FIG. 3 is a circuit diagram of a prior Boost Converter in parallel operation.

In FIG. 1 showing a general circuit of boost-chopper type converter of the present embodiment, current detection circuit 21 consists of two transformers 22,23. Said current transformer 22 is, instead of conventional resistor privided for current detection, connected in series to switching element 7, while current transformer 23 is connected in series to diode 8 as well. To each dotted side of each current transformer 22,23 is connected each anode of diodes 24,25, of which the cathodes are commonly grounded.

On the other hand, between the non-dotted sides of the transformers 22,23 and the cathodes of said diodes 24,25 is interposed resistor 26, of which the one terminal will output current detection signals to amplifying circuit 27. To the both output terminals +V,–V is connected output voltage detection circuit 31 which is a series circuit comprising resistor 28, variable resistor 29, and resistor 30, thus voltage detection signals can be supplied to the inverting input terminal of operational amplifier 32 from the connection point of said resistors 28 and 29.

Said operational amplifier 32 compares the voltage detection signals from said output voltage detection circuit 31 with the reference voltage applied to the non-inverting input terminal thereof, and then amplifies the difference therebetween, of which the result of comparison allows control circuit 10 to control the pulse conducting width for switching element 7.

Whereas, each converter unit 3,3A is provided with external current balance terminal CTB respectively, which is connected to each other in parallel operation so that current detection signals can be applied from external of the converters. And between said current balance terminal CTB and amplifying circuit 33 (i.e. current balance circuit) described hereinafter, is interposed a parallel circuit of MOSFET 34 and diode 35. Further, to the gate of said FET 34 are supplied control signals from abnormal operation detection circuit 36, which can immediately turn-off FET 34 in case of abnormal operation of converter units 3,3A.

With the structure thus far described, internal current detection signals from amplifying circuit 27 within internal converters 3,3A are compared with external current detection signals supplied across said current balance terminal CTB from other external converters 3,3A, thus the electric current can be allowed to flow into the connection point of resistor 28 and variable resistor 29 on the basis of the result of such comparison.

Hereinafter is explained the circuit structure of said amplifying circuit 27 and comparing circuit 33 with reference to FIG. 2.

The operational amplifying circuit 27 comprises two operational amplifiers A1,A2. The former operational amplifier A1, to which is applied current detection signals from current detection circuit 21, constructs what is called inverting-amplifying circuit 41 which comprises a resistor R1 connected to inverting input terminal thereof; a capacitor C1 connected between the inverting and non-inverting input terminals thereof; a resistor R2 and capacitor C2 connected between inverting input terminal and output terminal thereof. Whereas, the latter operational amplifier A2 acts as a voltage follower, in which capacitor C3 is connected between the inverting and non-inverting input terminals thereof, while the inverting input terminal is connected to the output terminal, so that the inverting-amplified current detection signals can be supplied to comparing circuit 33 from the output terminal thereof.

On the other hand, the comparing circuit 33 comprises; a resistor R3 interposed in the output terminal line of said operational amplifier A2; a difference amplifying circuit 42 comprising resistors R4 to R7 connected to both terminals of said resistor R3, and an operational amplifier A3, a resistor R8 of which the one terminal is connected to the output terminal of said operational amplifier A3; an operational amplifier A4 interposed between the other terminal of said resistor R8 and the resistor R7. With the structure thus made, electric current is allowed to flow from the other terminal of resistor R8 into the connection point of resistor 28 and variable resistor 29 in said output voltage detection circuit 31 shown in FIG. 1.

Incidentally, each value of resistance of each resistor R4 to R7 is so preset as to be R4/R5=R6/R7, and R4>>R3(i.e.R4 is much greater than R3), whereby said difference amplifying circuit 42 can obtain preset gain.

Hereinafter is described the operation of the present structure.

First, during turning-on of switching element 7, D.C. input voltage Vin is applied to inductance 6 and the primary winding of current transformer 22 so that electric energy may be charged within said inductance 6, while in current detection circuit 21, detected current may be allowed to flow into resistor 26 across diode 24 by the voltage induced in the secondary winding of the current transformer 22.

Secondly, during the turning-off of switching element 7, electric energy charged within said inductance 6 is delivered to the side of smoothing capacitor 9, passing through the primary winding of current transformer 23 and diode 8, together with D.C. input voltage Vin, thus D.C. output voltage Vout higher than the D.C. input voltage Vin can be obtained.

At this time, current detection circuit 21 permits detected current to flow into resistor 26 across diode 25 by means of said induced voltage in the secondary winding of current transformer 23. In other words, in accordance with the serial operation of switching element 7, average current from current transformers 22,23 is output, as current detection signals, from said current detection circuit 21 to amplifying circuit 27, which inverting-amplifies the current detection signals from said current detection circuit 21 up to R2/R1 times, to be output to comparing circuit 33 across the latter operational amplifier A2.

In the event of normal parallel operation of multiple converter units 3,3A, each converter unit 3,3A permits current detection signals obtained within converter units 3,3A to be output to comparing circuit 33 across amplifying circuit 27. At this time, as FET 34 is turned-on, from current balance terminal CTB is applied other current detection signals obtained from other converter units 3,3A to comparing circuit 33.

If load current I1 of one converter unit 3 flows greater than load current I2 of the other converter unit 3A, in the converter unit 3 having larger load current I1, the electric potential V1 at the connection point of resistors R3,R6 will become higher than the electric potential V2 at the connection point of resistors R3,R4, whereas in the converter unit 3A having smaller load current I2, said electric potential V2 will reversely become higher than V1. At this time, if the electric potential at the output terminal of operational amplifier A3 designates V3, and the electric potential at the connection point of resistor 28 and variable resistor 29 designates V4 respectively, an equation as follows is obtained by difference amplifying circuit 42;

$$V3 = V4 + \frac{R5}{R4} \times (V1 - V2)$$

Therefore, in the converter unit 3, electric potential V3 at the output terminal of operational amplifier A3 will rise, which will cause electric current to flow from comparing circuit 33 into variable resistor 29 and resistor 30 in order to lower the voltage level of voltage detection signals supplied to operational amplifier 32. That is, in this case, control circuit 10 can narrow the pulse conducting width for switching element 7, so that D.C. output voltage Vout supplied to load 11 will become low.

On the other hand, in the converter unit 3A, electric potential V3 at the output terminal of operational amplifier A3 will become lower than electric potential V4 at the connection point of resistor 28 and variable resistor 29, consequently, no electric current will flow from comparing circuit 33 into voltage detection circuit 31. Therefore, in this case, control circuit 10 widens the pulse conducting width for switching element 7 so that D.C. output voltage Vout will become high. With the structure thus made, D.C. output voltage Vout from each converter unit 3,3A can be equalized so that load current I1 and I2 will be kept equal to each other.

Incidentally, in case of causing some abnormal operation of one converter unit 3 during parallel operation, the supply of control signals from abnormal operation detection circuit 36 will be stopped, thus FET 34 can be immediately turned-off to interrupt the supply of current detection signals from external.

As hereinabove described, Boost Converter defined in the above-mentioned embodiments, can realize well-balanced load currents I1,I2 in each converter unit 3,3A, in other words, stable control can be possible by keeping the output balance equal.

Further, as the preferred embodiments employ a pair of current transformers 22,23 for current detection instead of resistor 5 in the prior art, power loss within converter units 3,3A can be ignored. Moreover, the equalization of output balance of converter units 3,3A can be most easily and inexpensively attained.

Incidentally, the present invention should not be limited to the aforementioned embodiments, it can be modified within a scope of the invention. For example, the switching elements should not be limited to disclosed MOSFET, switching transistor may be also employed therefor.

What is claimed:

1. A boost converter comprising a plurality of boost converter units in parallel operation, wherein each of said boost converter units has a series circuit of at least an inductance and a switching element, which is so structured that electric energy can be charged within said inductance during the turning-on of said switching element, while said electric energy can be discharged for delivering the same to the output side during turning-off of said switching element, each of said boost converter units comprising:

a current detection circuit for detecting the electric current flowing through said switching element and the output side of each of said boost converter units in order to output current detection signals; and a current balance circuit for controlling said switching element in order that output voltage from each of said boost converter units will be equalized in parallel operation on the basis of a result of comparison, which is able to be obtained by comparing current detection signals internal of one boost converter unit obtained from one current detection circuit with other detection signals external of said boost converter unit obtained from another current detection circuit.

2. A boost converter comprising a plurality of boost converter units in parallel operation according to claim 1, each of said boost converter units further comprising an abnormal operation detection circuit for interrupting the supply of current detection signals from another of said plurality of boost converter units in case of abnormal operation of one of said plurality of boost converter units.

3. A boost converter comprising a plurality of boost converter units in parallel operation according to claim 1, wherein each of said boost converter units further comprising:

a series circuit of at least a diode and a smoothing capacitor connected to both terminals of said switching element; and a control circuit for switching of said switching element.

4. A boost converter comprising a plurality of boost converter units in parallel operation according to claim 3, wherein said current detection circuit comprises current transformers connected in series respectively to said switching element and said diode, being so structured that current detection signals can be output by means of detected current from said current transformers.

5. A boost converter comprising a plurality of boost converter units in parallel operation, wherein each of said boost converter units comprises:

a series circuit of at least an inductance and a switching element connected to D.C. voltage source, a series circuit of at least a diode and a smoothing capacitor connected to both terminals of said switching element, and a control circuit for switching of said switching element, being so structured that electric energy can be charged within said inductance during the turning-on of said switching element, while said electric energy can be discharged for delivering the same to the output side during turning-off of the switching element;

a plurality of current transformers for current detection connected in series respectively to said switching element and said diode;

a current detection circuit to output current detection signals by means of said detected current from the transformers; and a current balance circuit for controlling pulse conducting width to said switching element in parallel operation by means of said control circuit on the basis of a result of comparison, which is able to be obtained by comparing current detection signals from one current detection circuit within one converter unit with other detection signals from another current detection circuit.

6. A boost converter comprising a plurality of boost converter units in parallel operation according to claim 5, further comprising an abnormal operation detection circuit for interrupting the supply of current detection signals from another of said plurality of boost converter units in case of abnormal operation of one of said plurality of boost converter units.

* * * * *